H. NESS.
MEANS FOR INDICATING INTERRUPTIONS IN IGNITION CIRCUITS.
APPLICATION FILED DEC. 6, 1921.
1,436,670.  Patented Nov. 28, 1922.
2 SHEETS—SHEET 1.
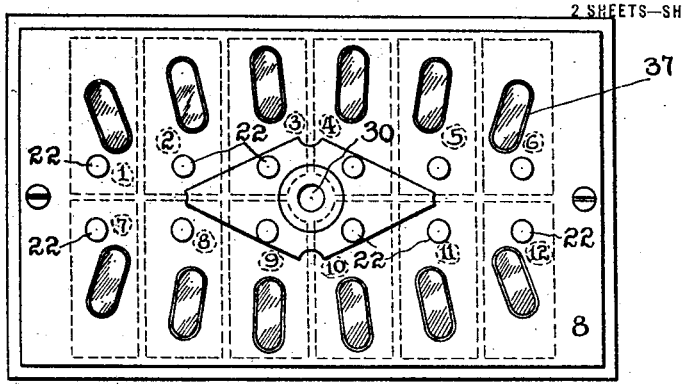
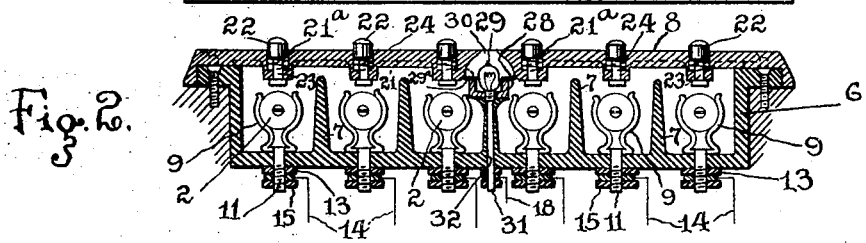
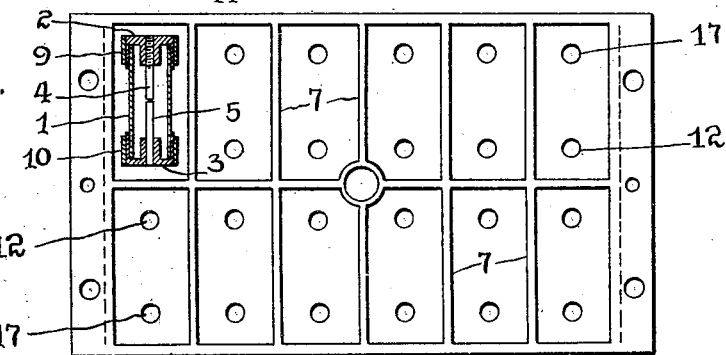
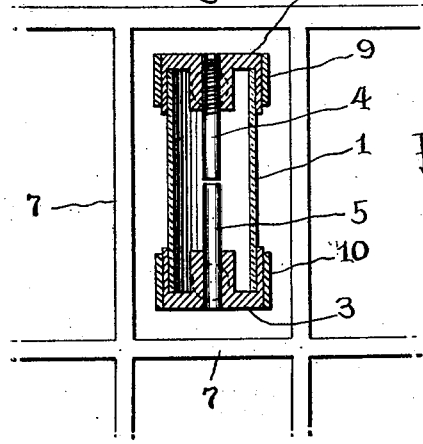
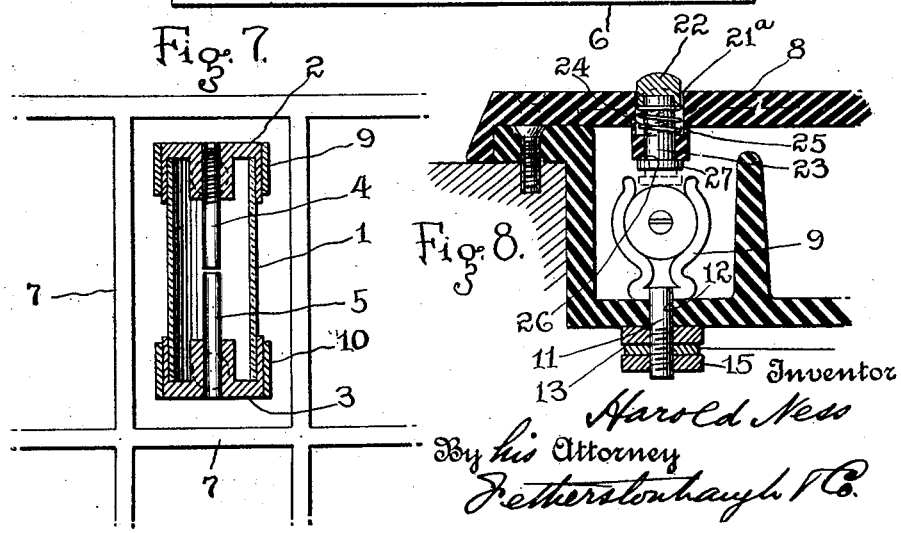
Inventor
Harold Ness
By his Attorney
Fetherstonhaugh & Co.

H. NESS.
MEANS FOR INDICATING INTERRUPTIONS IN IGNITION CIRCUITS.
APPLICATION FILED DEC. 6, 1921.

1,436,670.

Patented Nov. 28, 1922.

Inventor
Harold Ness
By his Attorney
Fetherstonhaugh & Co.

UNITED STATES PATENT OFFICE.

HAROLD NESS, OF JERSEY CITY, NEW JERSEY, ASSIGNOR, BY MESNE ASSIGNMENTS, OF ONE-HALF TO LOUIS F. NORTIER, OF NEW YORK, N. Y.

MEANS FOR INDICATING INTERRUPTIONS IN IGNITION CIRCUITS.

Application filed December 6, 1921. Serial No. 520,389.

*To all whom it may concern:*

Be it known that I, HAROLD NESS, a citizen of the United States, and resident of 278 Sherman Ave., Jersey City, in the county of Hudson and State of New Jersey, have invented certain new and useful Improvements in Means for Indicating Interruptions in Ignition Circuits, of which the following is a complete specification.

This invention relates to means for determining the proper functioning of spark plugs in the ignition system of a multi-cylinder engine, and my improvement is directed to means included in the electric circuit whereby visual indication may be had with respect to the inoperative state of any one or more of the plugs; means also being provided, in the instance of a short circuit, of determining the particular cylinder or cylinders thereby rendered inoperative.

With these objects in view my invention consists of an indicating device adapted to be attached, as to the dash board of a motor vehicle or craft, convenient for observation by the operator, and containing a number of pairs of opposed, detector electrodes, which are in spark gap relation, and are respectively representative of the individual cylinder ignition circuits, the arrangements being such that flashes across the spark gaps will be visible to the operator.

The pairs of spaced electrodes are included in shunt circuits that respectively lead from the circuit of the magneto, or other source of high tension current, to the terminal of the insulated electrodes of a spark plug, thence to one side of the gap provided by the spaced electrodes, the other side of the gap being grounded, thus completing the magneto or other high tension circuit, these shunts presenting paths for the flow of current when fouling of a plug prevents a discharge across its points, in which condition a flash across the points of the pair of detector electrodes will selectively indicate the particular cylinder that is out of service.

The detector electrode pairs may be numbered or given other designations whereby they may be identified with particular cylinders.

While the flash indications serve to identify a particular cylinder whose plug is fouled, a short circuit which may have occurred at any point in the system will not be similarly indicated, and other means are provided by my invention for determining the particular cylinder whose ignition service is thereby interrupted.

These other means comprise an auxiliary circuit, including a battery, a lamp, a series of leads in the circuit which respectively connect with the spark plugs of the different cylinders, and a ground connection for the battery. This circuit is normally interrupted and has switching means which bear designations corresponding with the designations for the cylinders, so that a battery circuit may be formed by closing any of the switches.

If a switch be operated to close an auxiliary circuit for a cylinder whose normal sparking circuit is short circuited, a lamp will thereby become energized and its light indicate the fact. But if a switch be operated to close an auxiliary circuit for a cylinder whose ignition circuit is working, then no energizing of the lamp can occur, because the battery current has too low a potential to jump the gap in the spark plug, and also too low a potential to overcome the resistance of the secondary winding in a spark coil, or the high tension winding of a magneto and still allow enough current to flow to heat the lamp filament to a visible degree.

Other features and advantages of my invention will hereinafter appear.

In the drawings:—

Figure 1 is a front elevation of a casing containing the indicating means whereby a fouled plug or a short circuited plug may be detected.

Fig. 2 is a section through the casing.

Fig. 3 is an interior view of the casing with the cover removed.

Fig. 7 is an enlarged, partial front interior view of the casing showing a spark gap cartridge in a pocket thereof.

Fig. 8 is an enlarged, sectional view thereof, and

Figure 4:
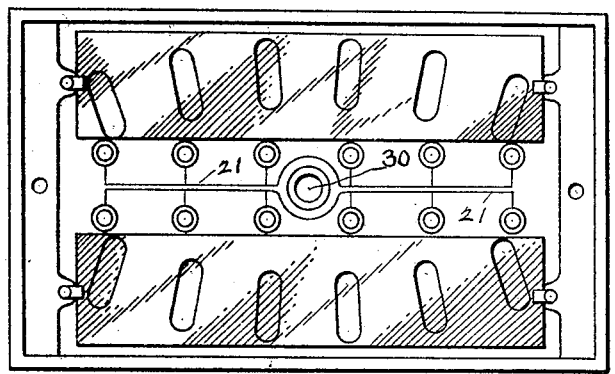
Fig. 4 is a reverse view of the casing cover.

Considering first the means included in my invention for detecting the presence of a fouled plug in the ignition system for an internal combustion engine, these means comprise a series of what I term cartridges, each cartridge having a shunt connection with the spark circuit for a separate cylinder and consisting of a transparent, cylindrical tube 1, with opposite, metallic end closure caps 2, 3, which each have a central aperture for the reception, respectively, of the opposed electrodes 4, 5, these electrodes being arranged in spark gap relation. One of the electrodes, as 4, is shown as threaded into the aperture in its cap, to be thus capable of axial adjustment relatively to the opposed electrode 5, to secure a suitable regulation of the gap.

A casing 6, composed of suitable insulation material, is provided with a number of partitions 7 whereby its interior space is divided into a number of compartments adapted to contain each an individual cartridge, the number of these compartments, with their contained cartridges corresponding with the number of cylinders possessed by the engine to be served.

A cover plate 8, which is also of non conductive material, is adapted to fit over the open side of casing 6 to form closure means for the compartments.

The cartridges are secured within their respective compartments by means of clips 9, 10, which embrace the opposite end caps thereof. The clips 9, which are shown as engaging the caps 2, have threaded end posts 11 that extend through apertures 12 in the back plate of the casing 1, and are made fast thereto by nuts 13.

These posts 11 also serve as binding posts, each engaging a separate shunt circuit wire 14 between the nut 13 and an outer nut 15. The clips 10 which are shown as engaging the caps 3, are also provided with posts 16, that extend through apertures 17 in the back plate of the casing, these posts serving as terminals for the ground connection.

It is the purpose of the spaced electrodes 4, 5, to provide a flash at their gap when the ignition current, by reason of the spark plug being in a fouled condition, is conducted around the spark points, instead of jumping the working gap. Therefore these electrodes 4, 5, are included in a shunt from the ignition circuit, which presents an easier path for the flow of current than that offered by the sooted plug, and in consequence a visual indication is given that the plug is not sparking. The electrodes 4, 5, are merely introduced in this application as an example of indicating means since obviously I may employ any other means, included in the shunt circuit, for creating an electrical discharge or display which will be visible to the operator.

The positions of the flashing cartridges in the casing are indicated by the numerals 1 to 12 in the example illustrated, as intended for service with a twelve cylinder engine, the numerals respectively designating corresponding cylinders, so that the operator, noting a flash and the numeral designation thereof, will know thereby which particular cylinder is out of service, and that the reason thereof is a fouled plug.

When the flow of current to a spark plug is interrupted by a short circuit at any point between the central electrode and the distributer, the grounding of the spark plug circuit prevents excitation of the shunt circuit, so that no indication can be afforded by the cartridges of failure in the ignition service from this cause.

Therefore, in order that a cylinder which is not firing on account of a short circuit may be identified, I provide an auxiliary circuit 18 which includes a lamp 19, a battery 20 with a ground connection, and leads 21, controlled by switching means through the spark plugs to ground, with respect to individual cylinders, so that the lamp will be energized to give a visual indication when the switch is operated to close the battery circuit for the cylinder whose firing circuit is thus interrupted.

In the example of means herein illustrated whereby a cylinder whose ignition current is short circuited may be identified, I provide, in the cover plate 8 of the casing 6 a series of orifices $21^a$, in each of which there is placed a push button 22, having a stem 23, whose path of movement permits it to make contact with the cap 2 of a cartridge, which thus closes the circuit through the spark plug, and forms a grounded connection, so that the auxiliary or battery circuit is thereby closed and the lamp energized. The push buttons 22 are held normally extended by springs 24, which each bear inwardly against an annular shoulder 25 formed upon a guideway 26 that extends inwardly from cover 8, and the stem 23 has a flange 27 that is normally seated against the end of guideway 26 to retain the push button and its stem in operative position.

In the structure of the casing 6 its central portion is provided with a recess formed by a metal ring 28 mounted on the intersecting partitions 7, this recess constituting a chamber to contain a bulb 29; the cover plate 8 also having an opposed recess with an aperture 30 through which the glow of the lamp may be noted. A binding post 31, to which the circuit wire 18 is connected, is entered through a passage 32 extending through the intersecting portion of the centered partitions 7, in alignment with recess 28, so that the binding post then enters into contacting relation with a contact of the socket portion of bulb 29. A metal ring $29^a$, secured to the cover plate 8 at the base of its bulb aperture, serves as a terminal for the leads 21, and engages the ring 28 which engages the other contact of the bulb, thus completing the circuit through a stem 23 when a push button is operated to make contact with a cap 2.

Figure 5:
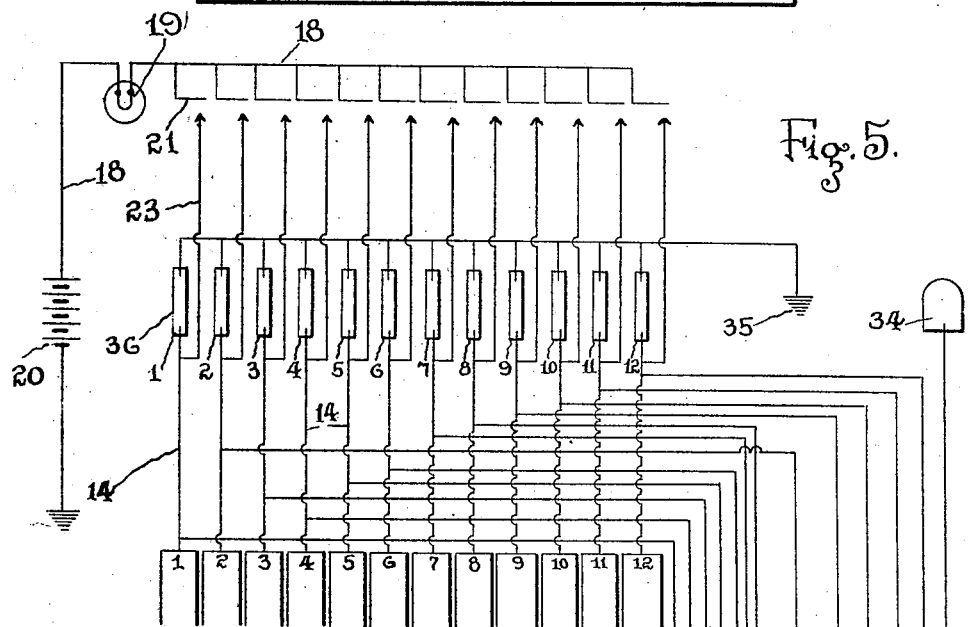
Fig. 5 is a diagrammatic view of the electrical circuits employed.
Figures 6, 9:
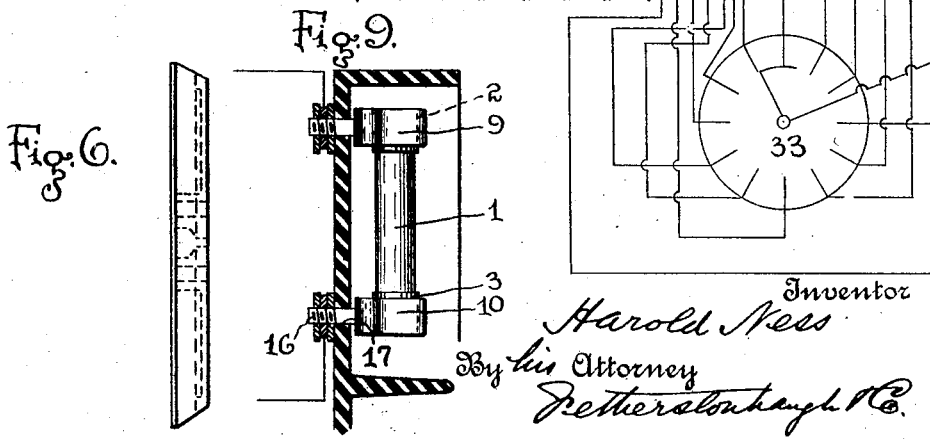
Fig. 6 is a side edge view of the casing cover.
Fig. 9 is a cross-sectional view of the casing, showing a cartridge in side elevation.

In the diagram of the circuits shown in Fig. 5, there will be noted the distributer 33 which passes current for the different cylinders from the magneto or other source of electrical energy, here indicated at 34. An engine having twelve cylinders, designated by the numbers 1 to 12, is here represented, together with the respective distributer circuits, which are grounded as at 35. In this view the cartridges having the flash gap for visual indication of a fouled plug are shown at 36, in shunt leads therefor bearing the reference character 14; these shunt leads also forming part of the battery circuit 18 which comes into use when there is a short circuit between the distributer and a spark plug.

The leads 21 of the auxiliary circuit 18, which communicate with the stems 23 of the push buttons, are shown in Figs. 2 and 8 as embedded in the material of which the cover plate 8 is composed, this comprising a compact means of insulating the wires and preserving them from injury.

The cover plate 8 is shown as provided with a number of openings 37, which each may be covered with glass or other transparent material, and are located respectively in front of the cartridge containing compartments, so as to permit exposure of the flashes which indicate a fouled, inoperative spark plug, whereupon the numeral by which the flashing cartridge is designated will indicate the particular cylinder that is out of service.

Variations within the spirit and scope of my invention are equally comprehended by the foregoing disclosure.

I claim:—

1. In an ignition system for multi-cylinder internal combustion engines including an electric circuit and a source of energy, the provision of an auxiliary circuit, including a battery and a signal, normally interrupted, a lead from the auxiliary circuit for each cylinder, and selective circuit closing means for the leads whereby the signal may be energized with respect to a cylinder whose flow of ignition current has become short circuited.

2. A short circuit indicating device for the ignition system of an internal combustion engine, including an ignition circuit, comprising a casing of insulation material, a signal within said casing having an observation opening, an auxiliary circuit including a battery and said signal, fixed contacts within the casing representative of the engine cylinders, and movable contacts also carried by the casing and adapted to be actuated individually to energize the signal with respect to a cylinder whose ignition is short circuited.

3. A circuit interruption indicating device for use with multi-cylinder, internal combustion engines, comprising a casing composed of insulation material, said casing having a base with a series of projecting walls which divide the casing into a number of compartments, the base being pierced with a number of holes for each compartment, a cover plate removably secured to said casing, to close it, and provided with observation openings for the respective compartments, a series of spark gap cartridges disposed respectively within said compartments, and engaging means for said cartridges having terminal stems which extend out through the holes in the base.

4. Signalling means for use with multi-cylinder internal combustion engines, comprising a casing composed of insulation material, said casing having a base with a series of projecting walls which divide the casing into a number of compartments, the base being pierced with a number of holes for each compartment, a cover plate provided with observation openings for the respective compartments, a series of spark gap cartridges having conductive caps at each end, engaging means for said cartridge caps having terminal stems which extend out from the holes in the base, a signal lamp, and said cover plate also provided with an exposed pocket for the signal lamp and with push buttons capable of respectively engaging the cartridge caps.

Signed at New York, in the county and State of New York, this 29th day of November, 1921.

HAROLD NESS. [L. S.]